US006220549B1

United States Patent
Tsunoda et al.

(10) Patent No.: US 6,220,549 B1
(45) Date of Patent: Apr. 24, 2001

(54) METHOD AND APPARATUS FOR FABRICATING PANELS USED FOR THE ACTIVE CONTROL OF SURFACE DRAG

(75) Inventors: Stanley I. Tsunoda, Encinitas; Thomas M. Bohanon, San Diego; Mervyn H. Horner, Del Mar; Lawrence D. Woolf, Carlsbad, all of CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 09/100,307

(22) Filed: Jun. 19, 1998

(51) Int. Cl.[7] .................................................. B64C 21/00
(52) U.S. Cl. ......................... 244/205; 244/204; 244/198; 244/201; 244/130; 114/67 R; 29/592.1; 29/825
(58) Field of Search ..................................... 244/198, 199, 244/204, 205, 201, 130; 114/67 R; 29/592.1, 825

(56) References Cited

U.S. PATENT DOCUMENTS

| | | | |
|---|---|---|---|
| 2,946,541 | 7/1960 | Boyd | 244/42 |
| 3,095,163 | 6/1963 | Hill | 244/12 |
| 3,162,398 | 12/1964 | Clauser et al. | 244/14 |
| 3,360,220 | 12/1967 | Meyer | 244/42 |
| 4,516,747 | 5/1985 | Lurz | 244/204 |
| 5,040,560 | 8/1991 | Glezer et al. | 137/13 |
| 5,320,309 | 6/1994 | Nosenchuck et al. | 244/205 |
| 5,437,421 | 8/1995 | Nosenchuck et al. | 244/205 |
| 5,439,191 | 8/1995 | Nichols et al. | 244/169 |
| 6,059,236 | * 5/2000 | Tsunoda | 244/201 |
| 6,079,345 | * 6/2000 | Tsunoda | 114/67 R |

OTHER PUBLICATIONS

Nosenchuck; "Boundary Layer Control Using the Lorentz Force", *Department of Mechanical and Aerospace Enginering*, (May 1997).

Henoch, et al.; "Experimental Investigation of a Salt Water Turbulent Boundary Layer Modified by an Applied Streamwise Magnetohydrodynamic Body Force", *Phys. Fluids*, vol. 7 (6) pp. 1371–1383 (Jun. 1995).

* cited by examiner

*Primary Examiner*—J. Woodrow Eldred
(74) *Attorney, Agent, or Firm*—Fitch, Even, Tabin & Flannery

(57) ABSTRACT

Improved methods and techniques for fabricating a panel of control cells, or a "control panel", useful in various electromagnetic turbulence control (EMTC) applications includes a layered structure which includes three main components or layers: a metal substrate or backing plate having a high magnetic permeability; a ribbed magnetic structure attached to the metal substrate; and an electrode board bonded to the ribs of the magnetic structure. The ribbed magnetic structure is realized, in one embodiment, by a series of rare earth permanent magnets placed side-by-side using a bowed tool to create permanent magnet columns. The magnet columns thus formed are precisely positioned and glued to the substrate or backing plate so as to form parallel magnetic ribs. An electrode board, similar to a printed circuit board, is then bonded to the ribs of the magnet columns, e.g., so that a back side of such electrode board rests on top of the magnetic columns or ribs. The electrode board includes a matrix of electrodes formed on its front surface. The boards are constructed in such a way that the electrodes are protected from exposure to corrosive elements. Electrical access to the electrodes is made from the back surface of the electrode board and, via access holes provided through the backing plate, from behind the backing plate.

26 Claims, 9 Drawing Sheets

METHOD AND APPARATUS FOR FABRICATING PANELS USED FOR THE ACTIVE CONTROL OF SURFACE DRAG

BACKGROUND OF THE INVENTION

The present invention relates to systems and methods for controlling the flow of a conductive fluid over a surface, and more particularly to a system and method that uses magnetic and electric fields to create Lorentz forces that affect the flow of a conductive fluid in a controlled manner near the boundary layer of a control tile, or a matrix of control tiles, immersed in the conductive fluid. Even more particularly, the invention relates to the methods and apparatus used to fabricate control tiles that permit the active control of surface drag of a conductive fluid.

Conductive fluids naturally occur in many different settings. It is noted that, for purposes of this application, the term "fluid" is used in its broad scientific sense to connote a liquid or a gas. Wherever such a conductive fluid is encountered, there is typically a need or desire to move a vessel or other object through the conductive fluid using a minimal amount of energy. One way to meet this need is to design such vessel or object so that the conductive fluid flows over the surface thereof with a minimal amount of drag.

Perhaps the most common example of a conductive fluid is sea water, which covers a significant percentage of the earth's surface. Ocean-going vessels traveling through sea water, e.g., ships or submarines, must exert significant amounts of energy in order to successfully navigate through the sea water at a suitable speed. Hence, much attention has been directed over the years to optimally designing the hull or shape of an ocean-going vessel in order reduce the drag (friction) the fluid encounters as it passes over the surface of the vessel. Despite such efforts, however, there remains a continual need to further reduce the drag encountered by conductive fluids passing over the surface of such vessels to thereby make the movement of such vessels through the fluid more efficient.

As is known in the art, a viscous fluid, and a body completely immersed in the fluid, form a boundary layer at the body's surface when the fluid and the body move relative to each other. That is, the layer of fluid in contact with the body is essentially at rest, while in an area removed from the body, the fluid is moving at its free-stream velocity. The region between the body and that area is known as a boundary layer. Where the fluid is a conductive fluid, electromagnetic forces may be introduced into the boundary layer in an attempt to alter the boundary layer characteristics. See, e.g., U.S. Pat. No. 5,437,421.

In copending U.S. patent application Ser. No. 09/099,811, filed concurrently herewith, now U.S. Pat. No. 6,079,345; and in copending U.S. Pat. application Ser. No. 09/099,852, also filed concurrently herewith, now U.S. Pat. No. 6,059,236; there is disclosed a system, a preferred embodiment of which uses a tangential force panel, for actively controlling a conductive fluid flowing over a control tile, or an array of control tiles forming a control panel, using multiplexed current driving. As disclosed in the referenced patent applications, both of which are assigned to the same assignee as is the present application, and both of which are incorporated herein by reference, magnetic and electric fields are used in a controlled manner in order to create Lorentz forces that affect the flow of a conductive fluid near the boundary layer of a control tile, or a matrix of control tiles, immersed in a conductive fluid.

More specifically, the Lorentz forces created by the systems disclosed in the referenced applications combine to form a vortex wavefront, referred to as a "roller", that is transverse to the fluid flow direction. Such roller wavefront advantageously allows the drag of the conductive fluid over the matrix of control tiles to be controlled in a beneficial manner. The use of such vortex wavefronts, or rollers, in a beneficial way is referred to generally as ElectroMagnetic Turbulence Control (EMTC).

When a panel comprising a matrix of control tiles is immersed within a conductive fluid, the EMTC invention disclosed in the referenced patent applications may be used to render movement of the panel through the conductive fluid more efficient, i.e., with less drag. For example, when such an EMTC panel, or a pair of such panels, is attached to the hull of an ocean-going vessel moving through sea water, or to the shell of an airborne vessel moving through an ionized atmosphere, the forces created at the surface of such panels may be used to help make propulsion of the vessel more efficient (with less drag) and quieter (with less detectable sound), to help steer the vessel (by creating increased drag forces on one side of the vessel and reduced drag forces on the other side), or to help stop or slow down the vessel (by creating increased drag).

As taught in the referenced patent applications, the control tiles form control cells, with each control cell including a pair of electrodes and at least one permanent magnet. The pair of electrodes are coupled to a current source which biases the electrodes to cause an electrical current to flow from a positive electrode (anode), through the conductive fluid in which the cell electrodes are immersed, to a negative electrode (cathode). The current source may be time multiplexed to better control the direction of the current flow between adjacent electrodes. A plurality of n current sources, which n is an integer of at least two, may be employed to create n phases of current that allow optimum creation of the "rollers". The permanent magnet(s) generates a magnetic field which interacts with the electrical current to create a Lorentz force that creates the vortex wavefronts, or "rollers", which influence the flow of the conductive fluid, near the boundary of the control tile, e.g., reduces drag of the fluid as it flows over the tile surface.

In order to obtain beneficial use of the EMTC invention(s) described in the referenced patent applications, it is necessary to manufacture the EMTC control panels used with the invention. Such EMTC control panels contain the control tiles or control cells which allow the electrical currents and magnetic fields to be created and beneficially interact with each other in a way that creates the Lorentz forces needed to control the drag of a control surface through the conductive fluid. To this end, there is a continuing need for better and more optimum EMTC control panel designs, as well as improved control panel manufacturing techniques and procedures.

SUMMARY OF THE INVENTION

The present application addresses the above and other needs by providing improved methods and techniques for fabricating a panel of control cells, or a "control panel", of the type disclosed in the referenced patent applications. Such control panel may advantageously be used in various electromagnetic turbulence control (EMTC) applications, and is thus commonly referred to as an "EMTC panel".

An EMTC panel made in accordance with the present invention includes a metal substrate (or metal backing plate), which substrate or plate may be curved, as required, to suit the particular application with which the EMTC panel is to be used. The metal substrate is selected to have a high magnetic permeability (or "high $\mu$", where "$\mu$" is the symbol for magnetic permeability). As is known in the art, a high $\mu$ metal provides a low reluctance magnetic path through which magnetic flux may flow with minimal loss.

A series of permanent magnets are placed side-by-side using an alignment tool to create permanent magnet columns. The alignment tool has the same curvature, if any, as the metal substrate and facilitates handing and aligning magnets that are already magnetized when mutual repulsion may tend to separate them. The magnet columns are affixed to the metal substrate (or backing plate) so as to form parallel spaced-apart magnetic ribs, where each rib has a magnetic polarity, and where adjacent ribs have an opposing magnetic polarity. In one embodiment, the magnet columns thus formed have an L-shaped cross-section, which L-shape includes two magnets: a vertical magnet with magnetic poles at the top and bottom (corresponding to the vertical leg of the "L"), and a horizontal magnet, with magnetic poles at the right and left (corresponding to the horizontal leg of the "L"). These L-shaped magnetic columns are then positioned and glued or bonded to the metal substrate (or backing plate) so as to reside side-by side, with the lower vertical section of one L-shaped column adjoining one end of the horizontal section of an adjacent L-shaped column, thus creating a cross-sectional pattern on the metal substrate that looks like LLLLLL . . . . In such LLLLL . . . pattern, the top portion of the vertical leg of each "L" represents the parallel spaced-apart magnetic ribs or ridges that have an alternating magnetic pole, and the underlining represents the metal substrate on which the magnetic columns are placed. The horizontal magnets (the horizontal leg of each "L") may be referred to as intermediate magnets because they bridge the distance between the vertical magnets (the vertical leg of each "L") of each magnetic column.

An electrode board, similar to a printed circuit board, is then placed on top of the magnet columns, e.g., so that a back side of such electrode board rests on top of the magnetic columns (on top of the ribs formed by the vertical leg of each "L"). The electrode board includes a matrix of electrodes formed on its front surface. The boards are constructed in such a way that the electrodes, which are formed on the front surface of the electrode board, are electrically accessible from the back surface of the board. Access holes are provided through the metal substrate, as required, to permit electrical connections to be made with electrode pairs from a location behind the metal substrate.

The EMTC panel of the present invention thus comprises a laminated structure which includes three main components or layers: a metal (high $\mu$) substrate (or metal backing plate); parallel, spaced-apart L-shaped or ribbed permanent magnet column; and an electrode board. In use, only the front surface of the EMTC panel, which comprises the front surface of the electrode board, is exposed to the conductive fluid.

The EMTC panel and methods of manufacturing an EMTC panel in accordance with the present invention address the following main areas:

1. Precision Assembly of Magnetized Magnets into Magnet Columns;

2. Corrosion Resistant Electrode Fabrication on a Flexible or Rigid Circuit Board;

3. Bonding of the Electrode Board to the Magnet Columns; and

4. Post Assembly Magnetization of Permanent Magnets to Enable Rapid Manufacturing.

It is a feature of the present invention to provide an EMTC panel, and methods for making an EMTC panel, which may be beneficially used for the active control of surface drag.

It is a further feature of the invention to provide EMTC panels having a matrix of electrodes thereon, with each individual electrode being fully protected from corrosion when immersed in or exposed to a conductive and corrosive fluid, e.g. seawater.

It is another feature of the invention to provide EMTC panels having permanent magnets associated therewith which create a magnetic field having a maximum value and orientation at an optimal location on the surface of the EMTC panel.

BRIEF DESCRIPTION OF THE DRAWINGS

The above and other aspects, features and advantages of the present invention will be more apparent from the following more particular description thereof, presented in conjunction with the following drawings wherein:

FIG. 6A-2 is a sectional view of a flat or straight bow tool;

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Before describing the EMTC panel of the present invention, it may first be helpful to review the basic operation of such a panel. Such operation is fully described in the previously-referenced patent applications, Ser. No. 09/099,811, and Ser. No. 09/099,852, now U.S. Pat. No. 6,059,236; both of which have been filed concurrently herewith, and both of which are incorporated herein by reference.

Figure 1A:
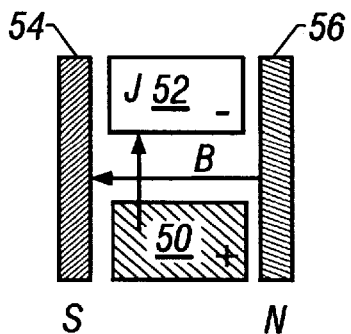
FIG. 1A shows a schematic plan view of a basic control cell made in accordance with the present invention.
Figure 1B:
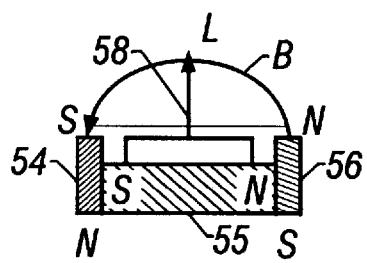
FIG. 1B shows a side view of the cell shown in FIG. 1A.

By way of overview, FIGS. 1A and 1B schematically illustrate one type of basic control cell device that may be made in accordance with the invention. FIG. 1A shows a plan view of one such basic control cell device; and FIG. 1B shows a side view of the basic control cell shown in FIG. 1A. As seen in these figures, electrodes 50 and 52 are energized with a suitable power source (not shown in these figures) so that electrode 50 is positive relative to electrode 52, thereby creating an electric field between the electrodes which causes an electric current to flow from electrode 50 to electrode 52 when the electrodes are immersed in a suitable conductive medium, such as sea water. The flow of such current is represented by the current vector J.

Still with reference to FIGS. 1A and 1B, it is seen that three magnets, 54, 55, and 56, are positioned and polarized so as to create a magnetic field B in the region above the electrodes 50 and 52. Thus, when the electrodes 50 and 52 are immersed within a conductive fluid, so as to create the current vector J, the current vector J reacts with the magnetic field B so as to create the force vector L Next, with reference to the planar view of FIG. 2A, an example is shown of how individual control cells, as shown in FIGS. 1A and 1B, may be arranged in a matrix 60 in order to create a vortex wavefront. In the matrix 60 illustrated in FIG. 2A, elongate magnets 61, 62, 64, 66, 68 and 70 form a boundary between adjacent columns of control cells. Five columns of electrodes are shown, by way of example. Each column of control cells, includes eight electrodes, or four pairs of control cells. In the left column, for example, a first pair of electrodes 52a and 50a is energized so that a force vector 58a is created that points away from the plane of the paper. The second and fourth pair of electrodes in the left column are not energized, while the third pair of electrodes 50a', 52a' is energized, creating a force vector 58a'.

The electrodes in the right (5$^{th}$) and middle (3$^{rd}$) columns of the matrix 60 are energized in the same manner as are the electrodes in the left column. The electrodes in the second and fourth columns, on the other hand, are energized such that the second and fourth pair of electrodes are energized, while the first and third pair of electrodes are not energized.

Figure 2A:
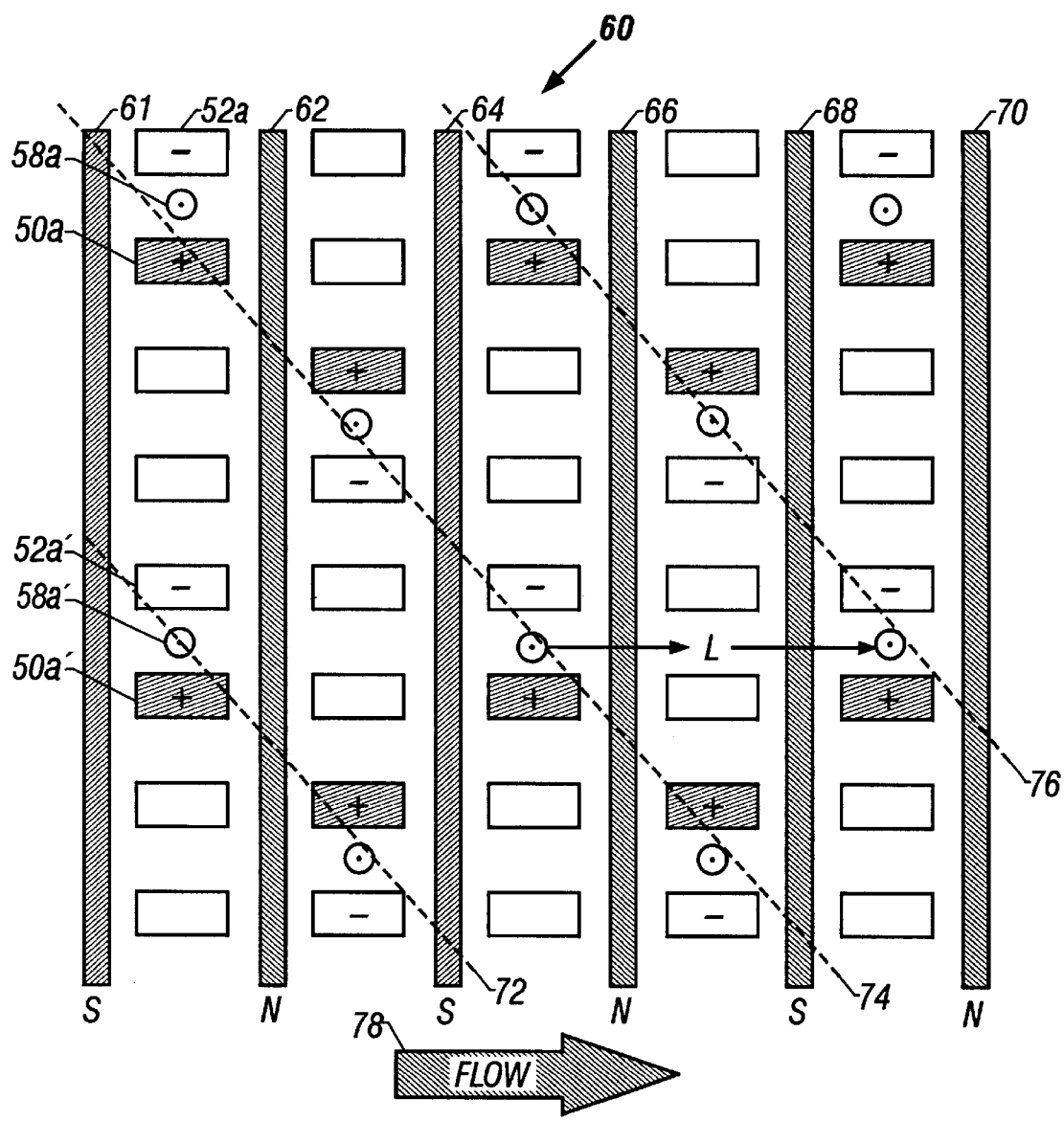
FIG. 2A illustrates one example of a Lorentz Force EMTC panel.

Still referring to FIG. 2A, it is seen that each pair of energized electrodes allows a force vector L, pointing out of the paper, to be created. In combination, the energization of the electrode pairs shown in FIG. 2A, and the resulting force vectors L, creates a vortex wavefront aligned with the lines 72, 74 and 76.

Figure 2B:
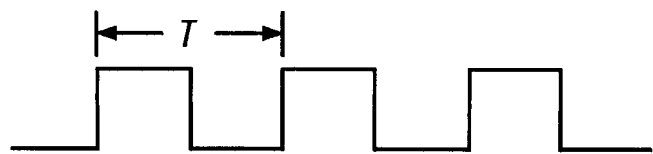
FIG. 2B shows one type of pulsing that may be applied to energize the electrode pairs.

The voltage applied to the electrodes in FIG. 2A is pulses as shown in FIG. 2B. As seen in FIG. 2B, the pulse period T is such that L~vT, where L is the distance between vortex wavefronts (shown in FIG. 2A) and v is the flow speed. The first application of the pulse sets up a set of propagating vortex wavefronts as shown in FIG. 2A. The voltage is then turned off and the wavefronts drift with the flow velocity (to the right in FIG. 2A). The vortex wavefronts have traveled a distance L when another pulse is applied to the electrodes. This pulse acts to constructively add to the existing flow of the vortex. In this way, the pulsing resonantly grows and maintains the strength of the vortices.

As described in the referenced patent applications, it is also possible to make a force panel similar to that shown in FIG. 2A, but utilizing multiplexed current drivers. With multiplexed current drivers, the non-energized columns in FIG. 2A may be eliminated so that all of the electrodes are energized. For example, the electrodes in the 1$^{st}$ column are energized with an "a" phase driver signal, while the electrodes in the 2$^{nd}$ column are energized with a "b" phase driver signal. With such a multiplexed scheme, wherein all of the electrodes are energized, the use of the panel space is optimized. As the pattern propagates to the right, the cathodes and anodes exchange their roles. That is, whereas electrode 50a is positive relative to its neighbor electrodes in the same column, such electrode becomes negative relative to its neighbors during the next cycle.

By way of example, the operation of an eight phase system (n=8) will be described. For such operation, reference is again made to FIG. 2A, which figure assumes five columns of eight electrodes each. During a first phase, or during a first portion of time that represents ⅛ of an energization cycle, the electrodes are energized as shown in FIG. 2A, i.e., the 1st electrode pair (electrodes 50a and 52a) and the 3rd electrode pair (electrodes 50a' and 52a') are energized in the 1st, 3rd, and 5th columns, while the 2d and 4th electrode pairs are energized in the 2d and 4th columns. Such energization pattern advantageously results in the vortex wavefronts along the lines 72, 74 and 76.

During a second portion of the energization cycle, which 2d portion also represents ⅛ of the energization period, but which occurs at a time immediately following the first portion, the pattern shown in FIG. 2A shifts up one electrode in each column of electrodes. That is, electrodes 52a and 52a' become the anodes of their respective electrode pairs, while electrodes 50a and 50a' are turned off, and with the electrodes immediately above 52a and 52a' becoming the cathodes. (Note, for purposes of FIG. 2A, the columns of electrodes are considered continuous, so that the electrode above electrode 52a is the electrode at the bottom of the column.) During a third portion of the energization cycle, which also represents ⅛ of the energization period or cycle, the electrodes immediately above electrodes 52a and 52a ' become the anodes of their respective electrode pairs, while electrodes 52a and 52a' are turned off, and with the electrodes immediately below 50a and 50a' becoming the cathodes.

The above-described process continues, with the energization pattern of the column shifting up one electrode during each phase, or ⅛ , of the energization cycle. Thus, after shifting up eight electrodes, or after one complete energization cycle, the energization pattern returns back to that shown in FIG. 2A. The net effect is that the vortex wavefronts 72, 74 and 76, for the pattern shown in FIG. 2A, propagate to the right, in the same direction as the flow arrow 78.

Thus, as described in the referenced patent applications, and as summarized above, it is seen that the present invention provides beneficial control of fluid motion over a surface, e.g., to reduce drag as a conductive fluid flows over the surface. More particularly, through the use of a time-multiplexed current driver, Lorentz forces may be selectively created so as to establish a vortex wavefront, or "roller", having velocity components that significantly reduce the drag associated with the flow of a conductive fluid over the control surface.

It is also seen that a control panel configuration as described in the referenced patent applications may optimally utilize the available panel space in order to produce force vectors, within the magnet field, all along the length of an energized column, wherein the force vectors create coordinated fluid perturbations, or "rollers", which may be used to reduce or increase drag associated with flow of a conductive fluid over the panel.

In order to better use the invention described in the referenced patent applications, an EMTC panel is needed that provides the matrix of electrodes and magnetic fields needed to generate the currents in the conductive medium which interact with the magnetic field in order to produce the desired tangential Lorentz forces. Such an EMTC panel is described next.

An EMTC Panel

Figure 3:
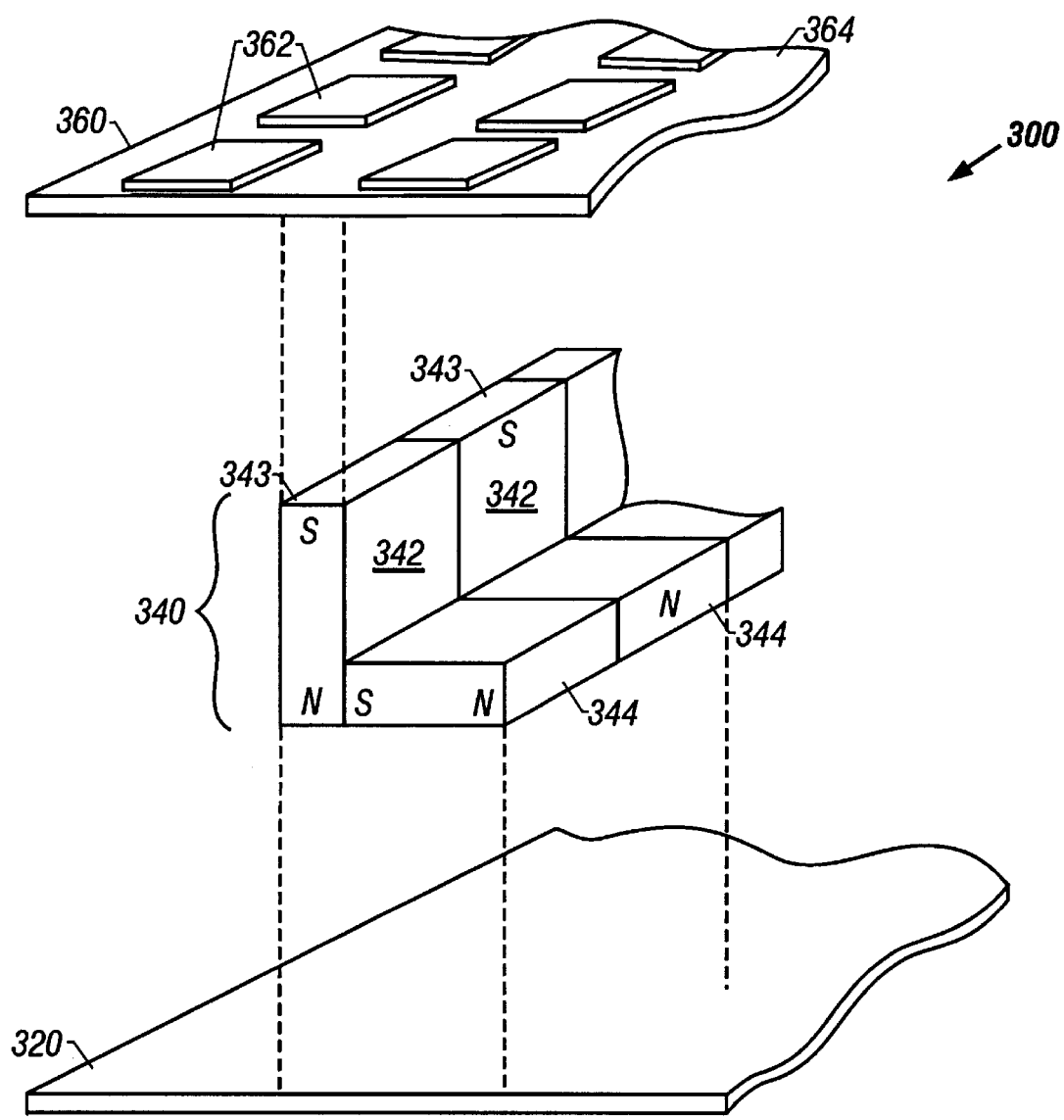
FIG. 3 is a simplified exploded view of an EMTC panel made in accordance with the present invention.
Figure 4:
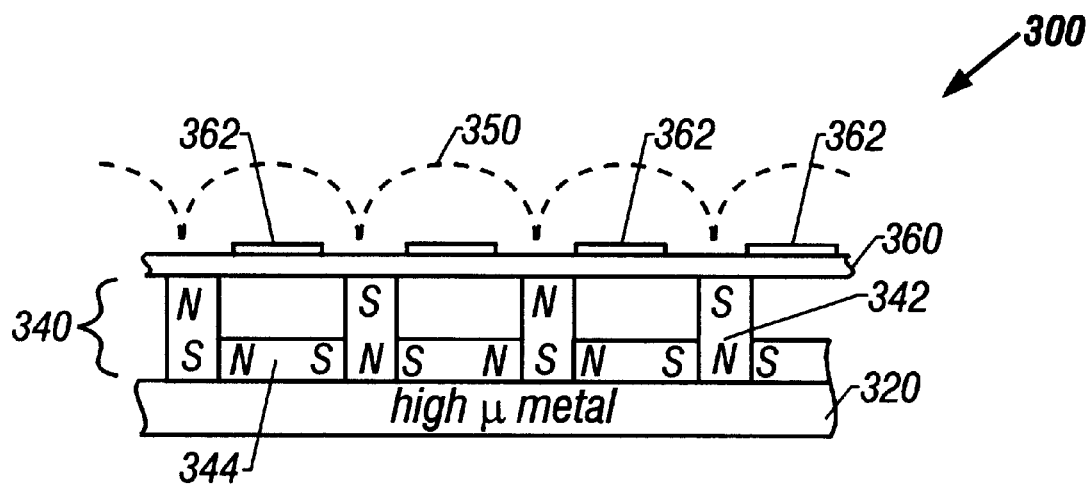
FIG. 4 is a side view of an EMTC panel made in accordance with the invention.

An exploded view of a preferred EMTC panel 300 is shown in FIG. 3, and a side view of such panel 300 is shown in FIG. 4. As shown in these figures, the preferred panel 300 includes a metal substrate (or metal back plate) 320, a multiplicity of L-shaped magnet columns 340 mounted on the substrate in a parallel pattern, and an electrode board 360.

The Metal Substrate 320

The metal substrate (or back plate) 320 shown in FIG. 3 is flat. For many applications, a flat EMTC panel is the panel of choice. For other applications, however, it may be useful to have an EMTC panel that is not flat, but is rather curved. For example, the panel may be curved so as to readily fit within or on the hull of an ocean-going vessel, or on the shell of an aircraft traveling through an ionized atmosphere. In such an instance, where a curved EMTC panel is the desired goal, a curved metal substrate 320', as illustrated in FIG. 5A, should be used. The metal substrate 320 or 320', which is also referred to as a metal backing plate, should be made from a metal having a high magnetic permeability (high $\mu$) such as 410 stainless steel.

Forming and Positioning the Magnetic Columns 340

In one embodiment, the L-shaped magnetic columns 340 comprise a series of bar-shaped permanent magnets 342 and 344, placed side-by-side so as to have an L-shaped cross-section, and having a magnetic polarity that places one of the magnetic poles along one edge of the bar, and the other magnetic pole along the other edge of the bar. For example, as seen in FIG. 3, the permanent magnet 342 has its South pole along its upper edge or ridge 343 (as oriented in FIG. 3), and its North pole along its lower edge. (Note, as used herein, the term "ends" of a bar magnet, regardless of its shape, refers to the poles, North or South, of the magnet. Thus, in this instance, where the magnets 342 and 344 are positioned "side-by-side", that means the poles or ends of the magnets are not directly touching each other.) Similarly, the permanent magnet 344 has its North pole along its right edge (as oriented in FIG. 3) and its South pole along its left edge. The magnets 342 and 344 are oriented in an "L" shape, with the magnet 342 being vertical (as oriented in FIG. 3, and thus representing the vertical leg of the "L"), and with the magnet 344 being horizontal (as oriented in FIG. 3, and thus representing the horizontal leg of the "L"). As seen best in FIG. 3, the magnets 342 and 344 are positioned side-by-side to form the L-shaped magnetic column 340, the column having an upper ridge 343 that faces away from the metal substrate, the upper ridge 343 having a common magnetic polarity along its entire length.

The electrode board 360 includes a non-conductive substrate 364 on which a matrix of electrodes 362 has been formed. The electrodes 364 are on a front side of the board 360, which front side is the side to be exposed to the conductive fluid. Electrical contact is made with the electrodes 364 from a back side of the board 360, as described below.

It is thus seen (see FIG. 4) that the preferred EMTC panel comprises a laminated structure wherein L-shaped magnetic columns 340 are positioned on a high $\mu$ metal substrate, with an electrode board 360 positioned over the magnetic columns so that the magnetic columns 340 on the back side of the electrode board 360 are interviewed between the electrodes 364 on the front side of the electrode board 360. The magnetic columns 340 produce a magnetic field (B field) 350 that is substantially perpendicular to the surface of the electrode board 360 in the region inbetween the electrodes 362. This is as desired so as to produce the strongest, most useful, Lorentz force when electrical current, flowing through the conductive medium exposed to the electrodes, interacts with the B field 350.

As seen best in FIG. 4, the adjacent L-shaped magnetic columns 340 provide a highly efficient magnetic circuit that produces a maximum magnetic force field B inbetween the electrodes 362. The high $\mu$ metal substrate 320 advantageously confines the B field to remain within the intermediate magnets 344. For some EMTC applications, it would be possible to eliminate the intermediate magnets 344 and rely upon the high $\mu$ metal substrate 320 to provide a magnetic path for the B field 350 created by the magnets 342.

The size and dimensions of the magnets 342 and 344 are selectable in order to suit the particular application with which the EMTC panel is to be used. For example, as suggested in FIGS. 3 and 4, the magnets 342 and 344 that make up the L-shaped magnetic columns may be of the same dimensions, i.e., the same basic size, thereby simplifying procurement and stacking of the magnets. Alternatively, and preferably, the magnets 342 could be made shorter and wider than the intermediate magnets 344. Optimum magnetic circuit design would dictate that this be the case (at least, assuming magnets of the same type, the magnets 342 should have a cross-sectional area larger than the cross-sectional area of the intermediate magnets 344) because roughly twice as much magnetic flux must flow through the magnets 342 than flows through the magnets 344.

The permanent magnets 342 and 344 should be selected to provide the highest energy density available. Typically, this is achieved by making the magnets 342 and 344 rare earth magnets, e.g., Neodymium Iron Boron (NdFeB) magnets. A Samarium Cobalt (SmCo) magnet could also be used. Advantageously, rare earth magnets provide a very strong B-field. Unfortunately, because rare earth magnets are very brittle, they can easily break, and are difficult to handle. A preferred manner for handling such rare earth magnets in order to form the magnetic columns 340 needed by the invention is described next.

Where the surface of the metal substrate 320' is curved, as shown, e.g., in FIG. 5A, then formation and placement of the magnetic columns 340 on such curved surface is made particularly difficult. A preferred technique for forming and placing such magnetic columns 340 on a curved surface 320' is as follows: First, the curved surface 320' should be sandblasted and degreased so that it is smooth (bondable)

and clean. Next, all of the magnets that are to be used in forming the magnetic columns 340 should be cleaned. This can be done by sanding, and then cleaning off the sanded magnet material with adhesive tape. Then, a suitable solvent may be used to clean the magnets.

Figure 5A:
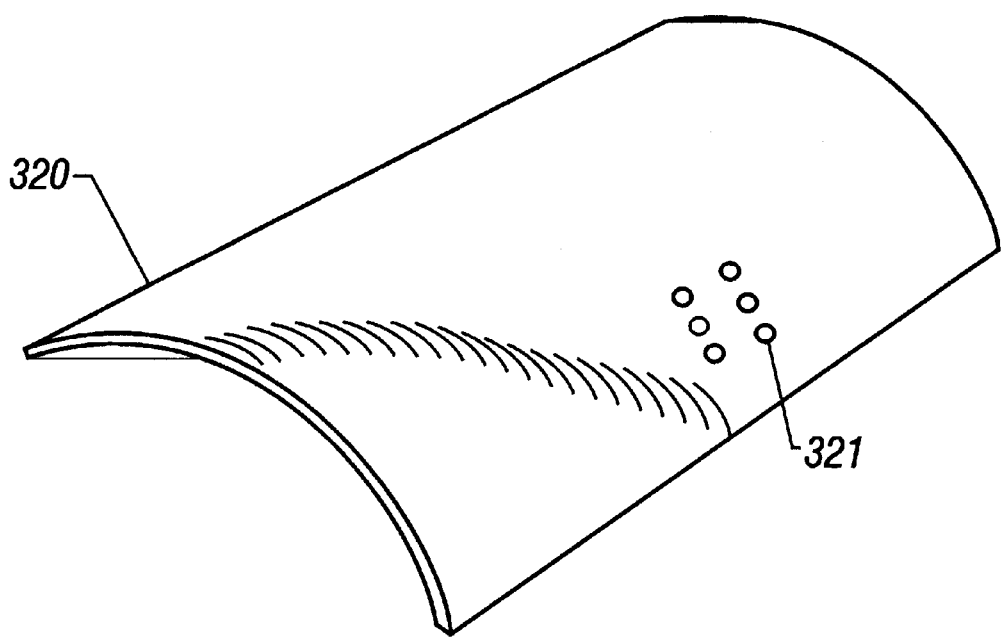
FIG. 5A illustrates a high $\mu$ curved metal substrate that may be used to make a curved EMTC panel in accordance with the invention.
Figure 6:
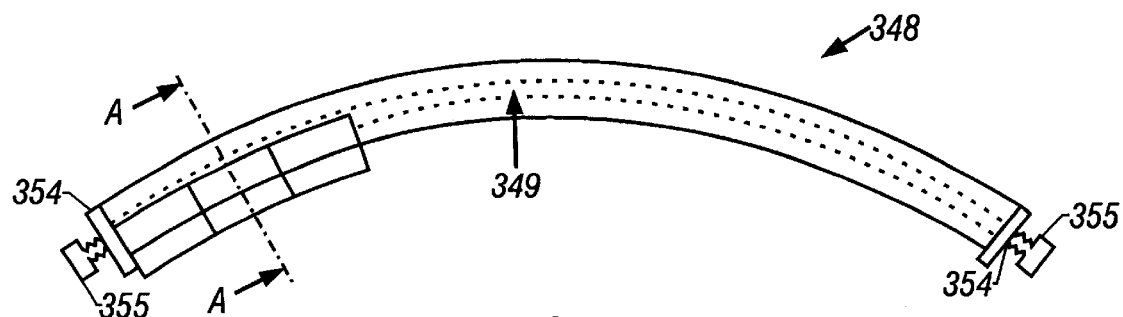
FIG. 6 is a side view of a curved bow tool used for forming a curved L-shaped magnet column prior to placing the column on a curved metal substrate of the type shown in FIG. 5A.
Figures 1, 6A:
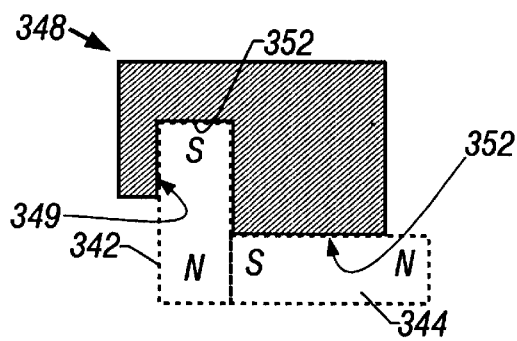
FIG. 6A-1 is a sectional view taken alone the line A—A of FIG. 6.

Once the magnets 342 and 344 have been thoroughly cleaned, and the surface of the high $\mu$ metal substrate 320' has been cleaned, then the magnets are loaded into a special bowed tool 348, illustrated in FIG. 6 and FIG. 6A-1. (FIG. 6A-1 shows a cross-sectional view of the tool 348, whereas FIG. 6 shows a side view.) The tool 348 is made from a non-magnetic material, such as aluminum. It is curved to match the curve of the metal substrate 320' (FIG. 5A). The tool 348 has a channel 349 formed therein sized to receive the magnets 342 and 344. The channel surfaces are preferably coated with Teflon 352. End plates 354 close the channel 349. Elastic tipped screws 355 (at least one at one end of the channel 349 is needed), such as silver-tipped set screws, allow an adjustable longitudinal pressure to be applied to the magnets within the channel 349. Mutual magnetic attraction and repulsion also helps retain the magnets within the channel of the bow.

Next, once the magnets are loaded in the bow tool 348, they are cleaned and a thin layer of epoxy (DP420 or CTD 521, for example) is applied to the exposed surface of the magnets and to the high permeability stainless steel substrate 320', or backing plate. The loaded bows 348 are then placed on a precision guide that allows the bows to be slid above the backing plate 320' and vertically dropped into position. The position may be checked with a small telescope mounted on a position transducer. Alternatively, the loaded bows 348 may be precisely located with the use of "markers", e..g, locating pins, holes, ribs, or other distinguishing features on the surface 320' of the back plate, and then a positioning template may be placed on the back plate that is aligned with the markers.

Figures 2, 6A:
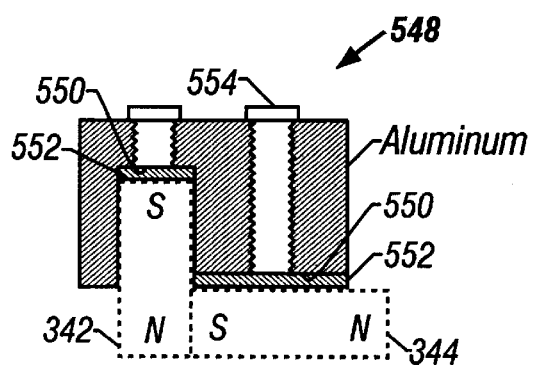
Figure 6B:
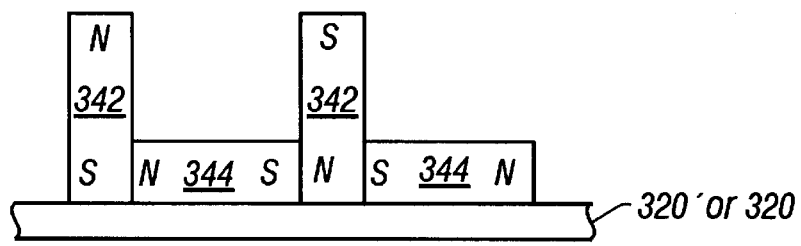
FIG. 6B is side view showing the preferred orientation of the L-shaped magnet columns on a high $\mu$ metal substrate.

Once the loaded bows 348 have been precisely positioned, the bows are screwed or clamped into position on the curved substrate 320'. The assembly is then placed in an oven for curing. Once cured, the bows are removed by loosening the set screws 355 and unscrewing or unclamping (releasing) the bows from the curved substrate 320', leaving the magnetic columns 340 glued to the surface of the curved substrate 320', as depicted in FIG. 6B, thereby forming a magnetic ribbed structure.

Should the metal substrate be flat, rather than curved, then a similar process is used to fasten the magnet columns to the surface of the substrate, or metal backing plate. That is, after proper cleaning and surface preparation, the individual magnets are loaded on to a flat, removable magnetic surface (e.g., a flat bow 548), a cross-sectional view of which is shown in FIG. 6A-2. The flat bow 548 has a nonmagnetic flat surface 550 onto which is attached a thin magnetic material strip 552 (such as ferrous steel) which holds the magnets. The thin magnetic strips 552 may be held in place through the use of screws or bolts 554. The magnets 342 and 344 are secured in the bow 548 with elastic tipped set screws on the ends. Once loaded in such a flat bow 548, the magnets are glued to the surface of the metal substrate 320 or 320' at precise locations using the same method described above for a curved substrate. After curing, the flat bow is removed by loosening the end set screws and screws 554, removing the magnetic strips 552, thereby separating the magnets from the magnetic strips 552, unscrewing or unclamping the bow from the flat substrate, and leaving the magnetic columns secured to the substrate 320, as shown in FIG. 6B.

The Electrode Board 360

One of the main problems associated with using electrodes immersed within, or exposed to, a conductive fluid, is corrosion. Copper electrodes, for example, if exposed directly to seawater last only a very short time. Thus, special processing must be used in order to form an electrode board 360 (FIGS. 3 and 4) that protects the electrodes from the corrosive environment occasioned by the conductive fluid.

Figure 7A:
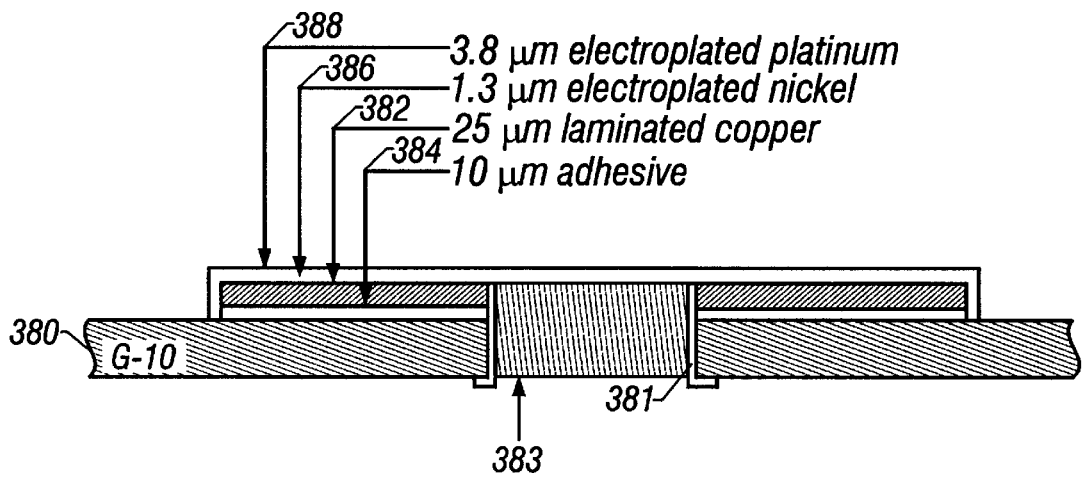
FIG. 7A is a schematic side view of a conventional type of electrode board.

Several different types of electrode boards 360 may be used with the present invention. A first type of electrode board configuration is shown in FIG. 7A. The configuration shown in FIG. 7A uses copper, nickel and platinum. A non-conductive substrate material, such as G-10 (or other glass or ceramic or phenolic type of material commonly used with printed circuit boards) is used as a board substrate. Such substrate 380 may be stiff or flexible. The electrodes are typically etched or otherwise formed to a desired pattern or shape from a thin layer 382 of copper about 25 $\mu$m thick which is secured to the substrate 380 using a suitable adhesive 384. The copper electrodes 382 are then plated with a layer 386 of Nickel that is about 1.3 $\mu$m thick. Finally, a layer 388 of platinum about 3.8 $\mu$m thick is electroplated over the layer 386 of Nickel. The Nickel and Platinum layers thus help protect the copper electrodes from the corrosive seawater (or other hostile environment) to which the electrodes are exposed.

Still referring to FIG. 7A, electrical contact with the electrodes 382 is made from the back side of the board 380 by means of through hole vias 381. Such vias 381 are preferably filled with a conductive material 383.

The electrode configuration shown in FIG. 7A offers the advantages of being readily manufacturable using existing printed board manufacturing techniques. Further, the electrodes may be made to any suitable dimensions, down to very small sizes. Disadvantageously, salt water eventually seeps through the layer 388 of electroplated platinum and causes corrosion of the copper layer 382.

Another electrode board configuration uses a physical vapor deposition (PVD) layer of titanium/platinum. Copper through-hole vias are filled with solder from a wave solder machine with careful control to avoid having to sand any solder bumps. Then, a coating of titanium is deposited, using a PVD technique, to about 4 $\mu$m thick on to the solder filled standard copper vias. Finally, an electroplated layer of platinum, about 150 $\mu$inches thick, covers the titanium coating.

Figure 7B:
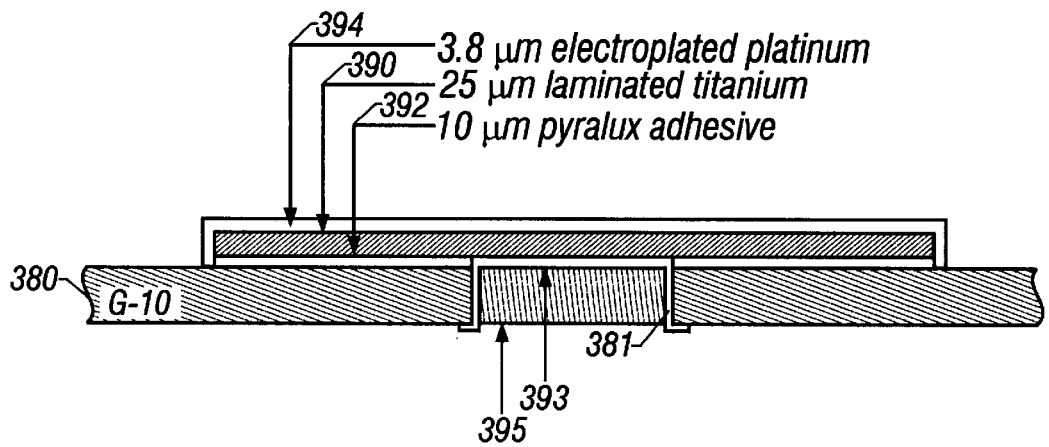
FIG. 7B is a schematic side view of an electrode board using titanium foil made in accordance with one embodiment of the invention.

Still another electrode board configuration is shown in FIG. 7B. The configuration shown in FIG. 7B utilizes titanium foil electrode technology to effectively hide the copper from the seawater. As seen in FIG. 7B, the front side of a G-10 board 380 is laminated with titanium or niobium foil 390 using Pyralux LF bond ply adhesive 392, or equivalent. Prior to such lamination, vias 381 are formed in the substrate 380, made from G-10 or a similar material, using conventional drilling and plating techniques. The laminated titanium (or niobium) is then etched to provide the desired electrode pattern. A layer 394 of platinum, about 3.8 $\mu$m thick, is then electroplated over the etched electrodes on the front surface of the board. A conducting metal 393 is then placed on the backside of such configuration as well as inside the vias 381. The vias 381 are then filled with a suitable conductive material 395.

Figure 7C:
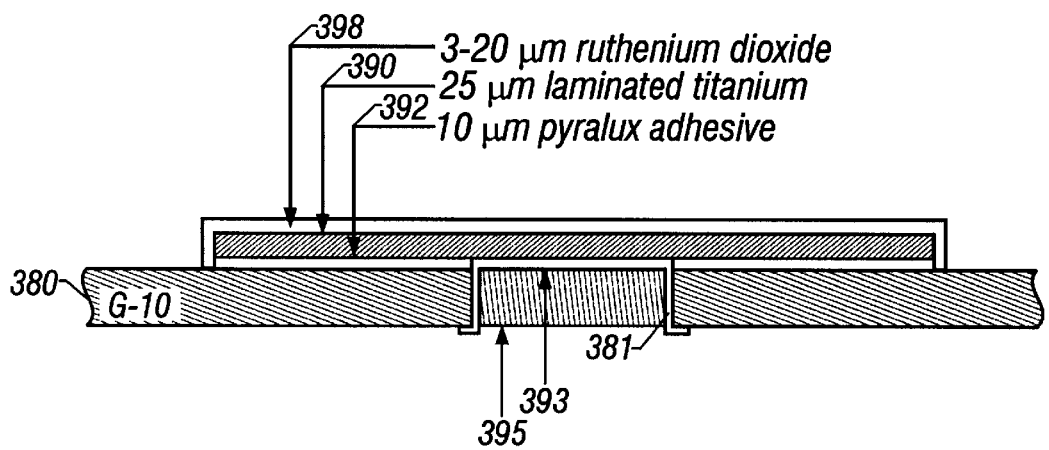
FIG. 7C is a schematic side view of an alternate electrode board configuration that uses an oxide protective coating, e.g., ruthenium dioxide.

Yet an additional electrode board configuration is illustrated in FIG. 7C. As evident from FIG. 7C, such configuration is the same as that shown in FIG. 7B with the exception that a layer 398 of ruthenium oxide or iridium oxide is coated on the titanium or niobium foil 390. Such coating is performed in a high temperature oven by oxidation of ruthenium chloride or iridium chloride, e.g., by oxidizing ruthenium chloride or iridium chloride in the presence of the electrodes.

Figure 8:
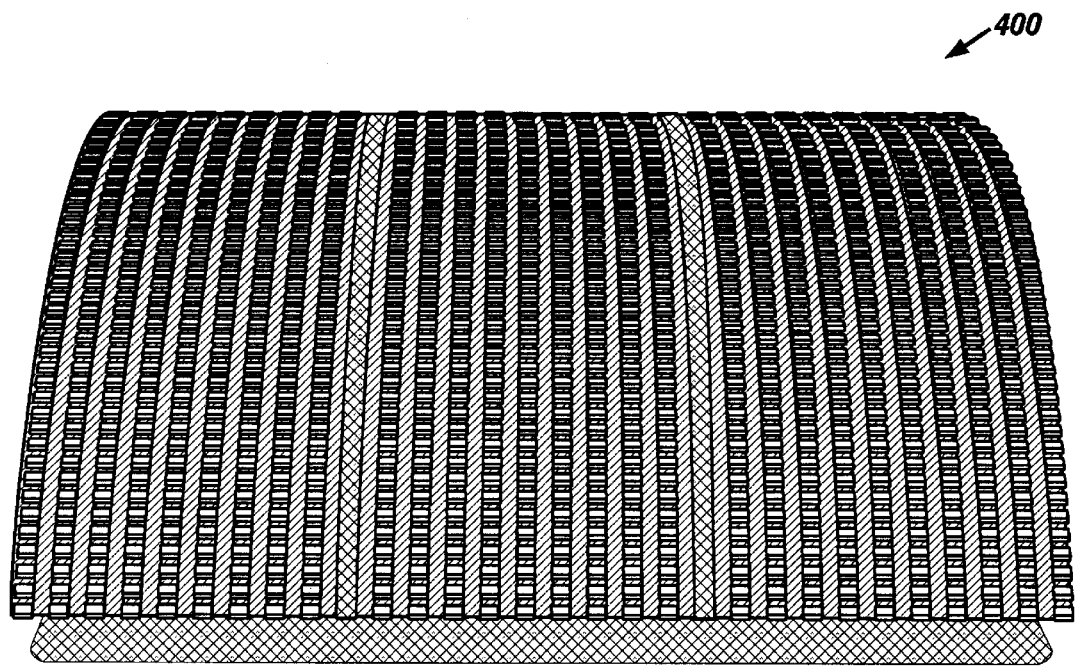
FIG. 8 is a perspective view of a curved electrode board usable for forming a curved EMTC panel in accordance with the invention.

A perspective view of an electrode board 400, made using a configuration as shown in FIG. 7A, is illustrated in FIG. 8. Note that such electrode board 400 is curved so that it can be used with a curved EMTC panel.

Bonding of the Electrode Board to the Magnets

Once the electrode board 360 has been made, and the magnet columns 340 have been attached to the high $\mu$ metal backing substrate 320, the back side of the electrode board must be attached to the magnets. In general, this is performed by coating the front electrode surface with a parting agent, such as polyvinyl alcohol, for example, to protect the front electrode surface from glue. In some instances, adhesive tape that has an adhesive which does not degrade upon contact with epoxy (flash breaker tape, for example) may be used on the edges of the front surface to provide additional protection. A suitable epoxy, such as DP 420 or CTD 521, is then applied to the top surface of the magnets 342 and possibly also to the backside of the board 360. The electrode board is then pressed on to the magnets with one of the methods described below. While pressing, the epoxy is cured in an oven. After curing, the parting agent and optional adhesive tape protecting the front surface is then removed.

One method of pressing, suitable for cylindrical magnetic structures, is to wrap mylar tape or other non-bonding material around the electrode boards with the magnetic structure mounted on a lathe.

Another method of pressing, more suitable for flat or curved plates, is to make a sandwich consisting of a sheet of peel-ply or other absorbtive material that will not bond to the electrode surface, a sheet of mylar or other material that will not bond to the electrode surface, a thin sheet of flexible, non-magnetic, scratch protective material (such as phenolic), and a thin, magnetic material sheet (e.g. ferrous steel), and place such sandwich on the electrodes. The magnetic attraction of the top sheet is thus used to press the electrodes on to the magnets.

Alternatively, as yet another pressing method, a vacuum bag device is made from a sheet of mylar and a load distributing, flexible, non-magnetic material (such as phenolic) placed on top of the electrodes. A vacuum is drawn on the electrode board and magnets which presses the board on to the magnets.

It is a feature of the invention that electrical contact may be made with the electrodes on a front surface of the electrode board 360 from a position on the back surface of the electrode board. Such connection is made through the vias 381 described above in conjunction with FIGS. 7A, 7B and 7C. Advantageously, electrical contact with the vias on the back surface of the electrode board 320 may be made from a location behind the EMTC panel, e.g., from a position behind the metal substrate or backing plate 320, using conventional wires 311, or other conductive elements, that pass through access holes 321 (FIGS. 5A, 5B) strategically placed through the metal substrate or backing plate 320.

Figure 5B:
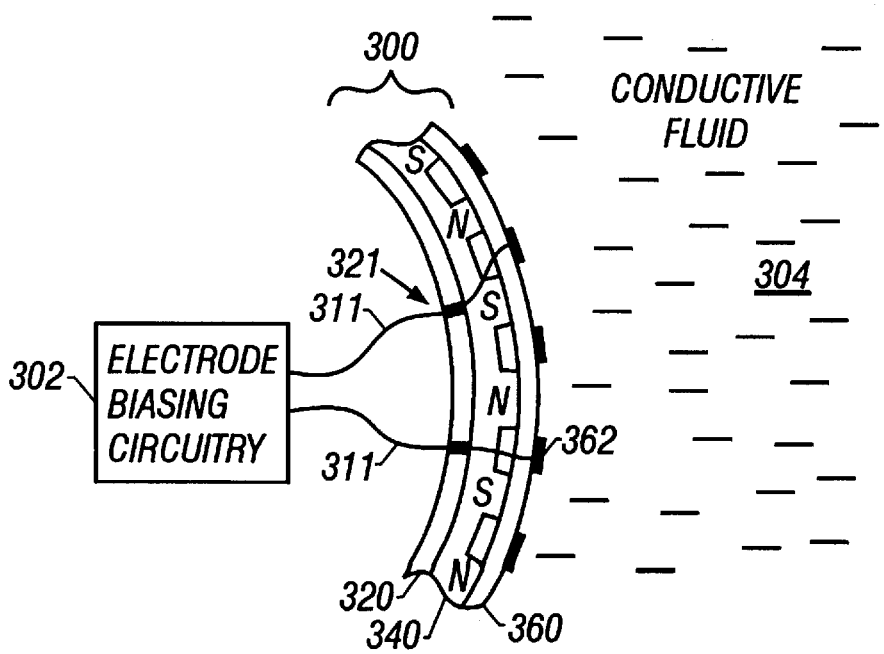
FIG. 5B shows an EMTC panel and its control using control circuitry located behind the EMTC panel.

As seen in FIG. 5B, control of the EMTC panels 300 is advantageously performed using appropriate biasing circuitry 302 from a location behind the panels 300, in an area which may be fully sealed and protected from the conductive fluid 304 to which the EMTC panel is exposed.

Alternative EMTC Panel Fabrication Techniques

As described above, the permanent magnet columns are assembled using very strong rare earth magnets arranged in a specific magnetic configuration. An alternative way to assemble a magnetic column for use within an EMTC panel as herein described is to assemble the rare earth magnetic material in a suitable configuration before magnetization, and then magnetize the magnetic material so that it possesses the desired magnetic properties.

Such post magnetization may be realized by premagnetized straight or gently curved magnet segments in a dc magnetic field in powder form prior to pressing. Isostatic pressing and subsequent sintering will then result in a properly oriented but unmagnetized magnet. The unmagnetized magnet segments may then be readily assembled in the desired flat or curved configuration. Once thus assembled, the magnet segments are magnetized in place with a strong pulsed field.

Figure 9:
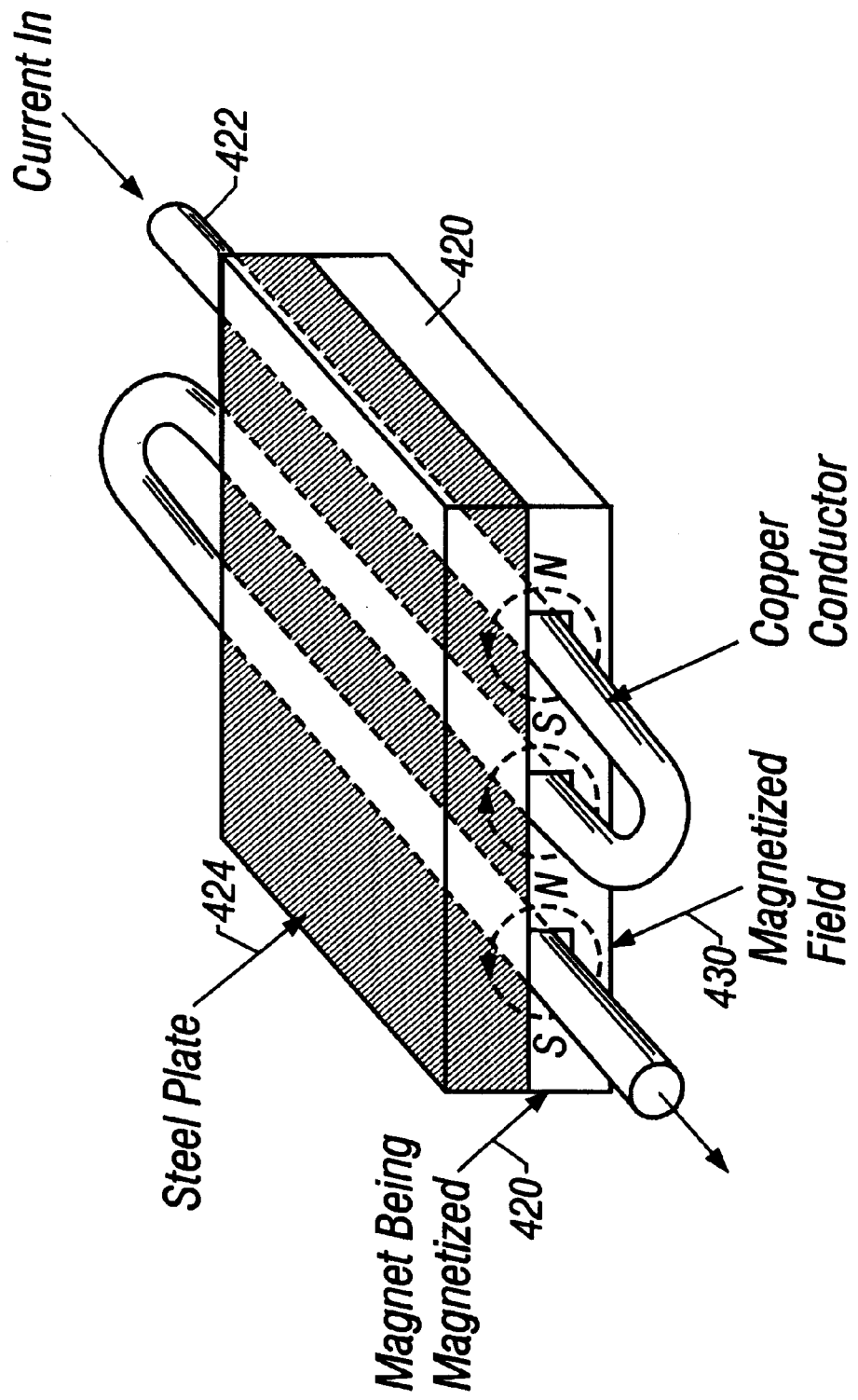
FIG. 9 illustrates one technique for magnetizing magnets after they are in place, thereby permitting construction of conformal EMTC panels while simplifying the magnet assembly of such panels.

By way of example, a ribbed magnetic structure 420 may be magnetized through the use of a copper wire 422 laid between the ribs of the structure 420 in a zig-zag manner, as illustrated in FIG. 9. The wire 422 must be electrically and thermally insulated from the magnets. A large current pulse is then applied to the wire, creating a magnetized field 430 around the wire. The polarity of the magnetization is such that adjacent ribs of the magnetic structure exhibit opposite magnetic polarity, as is desired for the EMTC panel. Several tesla may be obtained without vaporizing the copper wire. Advantageously, this method of magnetization is effective on curved or flat ribbed structures.

Figure 10:
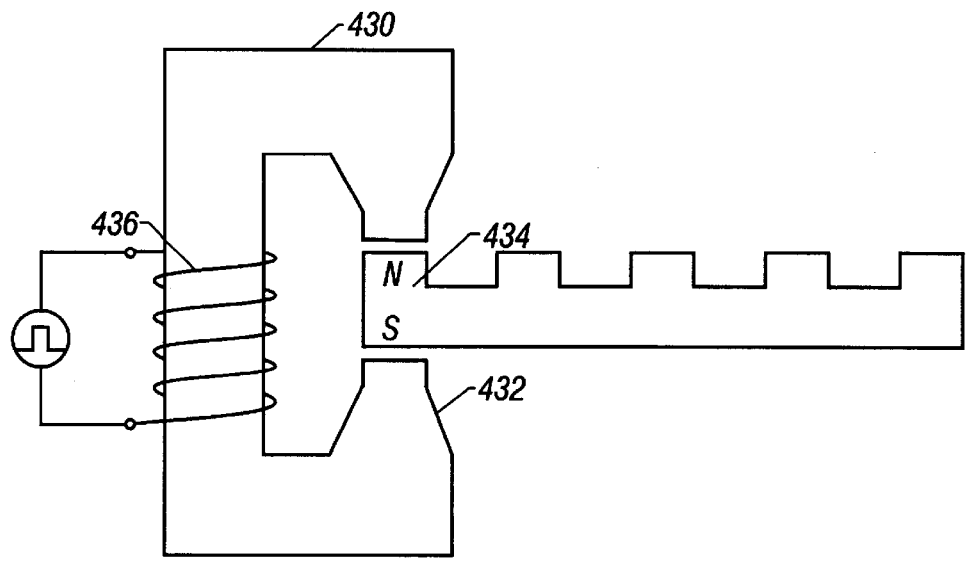
FIG. 10 illustrates another technique for magnetizing a ribbed magnetic structure formed using unmagnetized magnetic materials.

Alternatively, a magnetic circuit consisting of a C-shaped magnetic material 440 with concentrating pole pieces 432 made of high permeability, high saturation field material (Hyperco, for example) may be used, as shown in FIG. 10. The circuit is powered by a pulsed electromagnet 436. The pole pieces magnetize over a small local region, and the material 434 to be magnetized is moved between the pole pieces. Magnetization is along the surface normal to the pole pieces. Arbitrary configurations may be magnetized through proper positioning relative to the pole pieces.

As described above, it is thus seen that the present invention provides an EMTC panel, and methods for making an EMTC panel, which may be beneficially used for the active control of surface drag, as described, e.g., in the copending patent applications referenced above.

It is also seen that the invention provides EMTC panels having an electrode board with a matrix of electrodes on a front surface thereof wherein each individual electrode is fully protected from corrosion when immersed in or exposed to a conductive and corrosive fluid, e.g. seawater.

It is further seen that the invention provides methods of making EMTC panels using unmagnetized magnetic materials, which materials are subsequently magnetized once the desired magnetic structures have been assembled.

While the invention herein disclosed has been described by means of specific embodiments and applications thereof, numerous modifications and variations could be made thereto by those skilled in the art without departing from the scope of the invention set forth in the claims.

What is claimed is:

1. An electromagnetic turbulence control (EMTC) panel for the active control of drag of a conductive fluid over a front surface of the EMTC panel, comprising:

a metal substrate having a front side and a back side, and having a high magnetic permeability;

a multiplicity of parallel magnetic columns affixed to the front side of the metal substrate, each of the parallel magnetic columns having an upper ridge facing away from the front side of the metal substrate;

an electrode board having an array of electrodes on a front side thereof, and having a back side affixed to the upper ridge of at least one of the parallel magnetic columns, the electrodes being arranged in columns parallel to the parallel magnetic columns wherein adjacent parallel magnetic columns on the back side of the electrode board are interleaved between adjacent columns of electrodes on the front side of the electrode board; and means for making electrical contact with the electrodes on the front side of the electrode board from a location on the back side of the electrode board.

2. The EMTC panel of claim 1 wherein the electrode board includes a non-conductive substrate onto which the electrodes are formed on the front side of the electrode board, the electrodes being covered with a non-corrosive protective layer, and wherein the means for making electrical contact with the electrodes from a location on the back side of the electrode board comprises plated through hole vias that pass through the electrode board between the back side of the electrode board and the front side of the electrode board.

3. The EMTC panel of claim 2 wherein the plated through-hole vias are filled with a conductive material.

4. The EMTC panel of claim 2 wherein the electrodes are made from a layer of copper having a layer of nickel electroplated on the layer of copper that has been bonded to the front side of the non-conductive substrate and etched to a desired electrode pattern.

5. The EMTC panel of claim 2 wherein the electrodes are made from a layer of titanium foil that has been bonded to the front side of the non-conductive substrate and etched to a desired electrode pattern.

6. The EMTC panel of claim 2 wherein the electrodes are made from a layer of niobium foil that has been bonded to the front side of the non-conductive substrate and etched to a desired electrode pattern.

7. The EMTC panel of claim 2 wherein the non-corrosive protective layer comprises a layer of platinum that is electroplated over the electrodes.

8. The EMTC panel of claim 2 wherein the non-corrosive protective layer comprises an oxide layer formed from one of ruthenium and iridium.

9. The EMTC panel of claim 2 wherein the metal substrate is curved.

10. The EMTC panel of claim 2 wherein each of the parallel magnetic columns is made from a plurality of permanent magnets having North and South magnetic poles on opposite sides thereof, the magnets being placed side-by-side so that a common magnetic pole extends along opposing sides of each of the parallel magnetic columns.

11. The EMTC panel of claim 10 wherein the plurality of permanent magnets comprises rare earth magnets.

12. The EMTC panel of claim 2 wherein each of the parallel magnetic columns is made from non-magnetized material formed in a ribbed structure, and wherein the EMTC panel includes means for magnetizing the ribbed structure.

13. A method of making an electromagnetic turbulence control (EMTC) panel for active control of drag of a conductive fluid over a front surface of the panel comprising the steps of:

forming magnetic columns having opposing magnetic poles on opposite sides thereof;

attaching the magnetic columns to a metal back plate having a high magnetic permeability so that each magnetic column is parallel to and spaced apart from an adjacent column, and so that one of the opposing magnetic poles faces towards the metal back plate and another of the opposing magnetic poles faces away from the metal back plate, and further so that adjacent magnetic columns have magnetic poles of alternating polarity facing away from the metal back plate, the magnetic columns thus forming ribs on the metal back plate;

forming electrodes on a front surface of an electrode board in columns so that each column of electrodes is parallel to and spaced apart from an adjacent column of electrodes;

forming electrical vias that connect with the electrodes from a back surface of the electrode board; and bonding the back surface of the electrode board to the ribs of the magnetic columns so that the ribs of the magnetic columns on the back surface of the electrode board are parallel to and interleaved between adjacent columns of electrodes on the front surface of the electrode board.

14. The method of claim 13 further comprising the step of covering the electrodes with a protective coating.

15. The method of claim 14 wherein the step of covering the electrodes with a protective coating comprises forming an oxide layer on the electrodes.

16. The method of claim 13 further including the step of filling the electrical vias with a conductive material.

17. The method of claim 13 wherein the step of forming magnetic columns having opposing magnetic poles on opposite sides thereof comprises placing a multiplicity of permanent magnets in a column side-by-side, each being oriented so that the same magnetic pole extends along a side edge of the column.

18. The method of claim 17 wherein the step of forming magnetic columns further comprises forming each magnetic column so as to have an L-shaped cross section, with a vertical portion of the L-shaped cross section comprising a first permanent magnet, and with a horizontal portion of the L-shaped cross section comprising a second permanent magnet, and with a cross section of all of the parallel spaced apart magnetic columns having a LLLLL . . . shape, with each L-shaped magnetic column being positioned adjacent to another L-shaped magnetic column.

19. The method of claim 18 wherein the step of forming the magnetic columns further includes loading a non-magnetic bow with a multiplicity of permanent magnets so as to form each of the magnetic columns, and so that each of the ribs of the magnetic columns protrudes from the bow; placing the bow over the metal back plate; positioning the bow at the desired location on the back plate; inserting a bonding agent between each of the ribs of the magnetic columns and the metal back plate; temporarily clamping the bow to the metal backplate while the bonding agent cures; and unclamping and removing the bow.

20. The method of claim 19 wherein the step of loading a non-magnetic bow comprises loading a non-magnetic curved bow wherein the magnetic columns are curved for positioning on a curved metal back plate.

21. The method of claim 19 wherein the step of loading a non-magnetic bow comprises loading a non-magnetic flat bow wherein the magnetic columns are flat for positioning on a flat metal back plate.

22. The method of claim 21 wherein the multiplicity of permanent magnets loaded into the flat bow are held magnetically on the flat bow using removable magnetic material.

23. The method of claim 19 wherein the step of positioning the bow at the desired location on the metal back plate comprises optically positioning the bow using a telescope mounted on a position transducer.

24. The method of claim 19 wherein the step of positioning the bow at the desired location on the metal back plate comprises adding locating markers on the surface of the metal back plate and positioning a template over the metal back plate aligned with the markers.

25. The method of claim 1 further comprising a magnetic field extending from the upper ridge of each of the parallel magnetic columns between the electrodes and perpendicular to the electrode board wherein upper ridges of adjacent parallel magnetic columns comprise magnetic poles having opposite polarity.

26. The method of claim 15 wherein forming an oxide layer on the electrodes comprises oxidizing ruthenium chloride or iridium chloride in the presence of the electrodes.

* * * * *